United States Patent
Zhou et al.

(10) Patent No.: US 10,389,555 B2
(45) Date of Patent: Aug. 20, 2019

(54) PHASE DELAY DIFFERENCE-BASED CHANNEL COMPENSATION

(71) Applicant: Hewlett Packard Enterprise Development LP, Houston, TX (US)

(72) Inventors: Dacheng Zhou, Fort Collins, CO (US); Daniel Alan Berkram, Loveland, CO (US); Peter David Maroni, Windsor, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/065,409

(22) PCT Filed: Jan. 28, 2016

(86) PCT No.: PCT/US2016/015415
§ 371 (c)(1),
(2) Date: Jun. 22, 2018

(87) PCT Pub. No.: WO2017/131708
PCT Pub. Date: Aug. 3, 2017

(65) Prior Publication Data
US 2018/0375693 A1 Dec. 27, 2018

(51) Int. Cl.
*H04L 25/03* (2006.01)
*H04L 7/00* (2006.01)
*H04L 25/49* (2006.01)
*H04L 7/033* (2006.01)

(52) U.S. Cl.
CPC ...... *H04L 25/03038* (2013.01); *H04L 7/0025* (2013.01); *H04L 7/0087* (2013.01); *H04L 25/49* (2013.01); *H04L 7/033* (2013.01); *H04L 2025/03433* (2013.01)

(58) Field of Classification Search
CPC ............ H04L 25/03038; H04L 7/0025; H04L 7/0087; H04L 25/49; H04L 7/003
See application file for complete search history.

(56) References Cited

U.S. PATENT DOCUMENTS

| | | | |
|---|---|---|---|
| 6,055,269 A | * | 4/2000 | Drost ................ H04L 25/03878 333/18 |
| 7,136,001 B2 | | 11/2006 | Hode et al. |
| 7,508,892 B2 | | 3/2009 | Kibune et al. |
| 7,702,053 B2 | | 4/2010 | Chen et al. |

(Continued)

OTHER PUBLICATIONS

International Search Report & Written Opinion received in PCT Application No. PCT/US2016/015415, dated Sep. 12, 2016, 14 pages.

(Continued)

*Primary Examiner* — Jaison Joseph
(74) *Attorney, Agent, or Firm* — Trop, Pruner & Hu, P.C.

(57) ABSTRACT

A technique includes determining a first phase delay associated with communication of a bit pattern having a first bit transition frequency over a communication channel; and determining a second phase delay associated with communication of a bit pattern having a second bit transition frequency greater than the first bit transition frequency over the communication channel. The technique includes regulating a compensation applied to a signal received from the communication channel based at least in part on a difference of the first and second phase delays.

15 Claims, 5 Drawing Sheets

(56) References Cited

U.S. PATENT DOCUMENTS

| | | |
|---|---|---|
| 9,014,318 B2 | 4/2015 | Hollis |
| 2004/0114700 A1 | 6/2004 | Yu et al. |
| 2006/0233291 A1* | 10/2006 | Garlepp ................ H04L 25/063 |
| | | 375/355 |
| 2010/0046601 A1 | 2/2010 | Momtaz et al. |
| 2010/0046683 A1 | 2/2010 | Beukema et al. |
| 2010/0135378 A1 | 6/2010 | Lin et al. |
| 2014/0307769 A1 | 10/2014 | He et al. |
| 2015/0043698 A1* | 2/2015 | Chang ................... H04L 7/0041 |
| | | 375/374 |

OTHER PUBLICATIONS

Multi-Rate SerDes Transceiver for IEEE 1394b Applications.

* cited by examiner

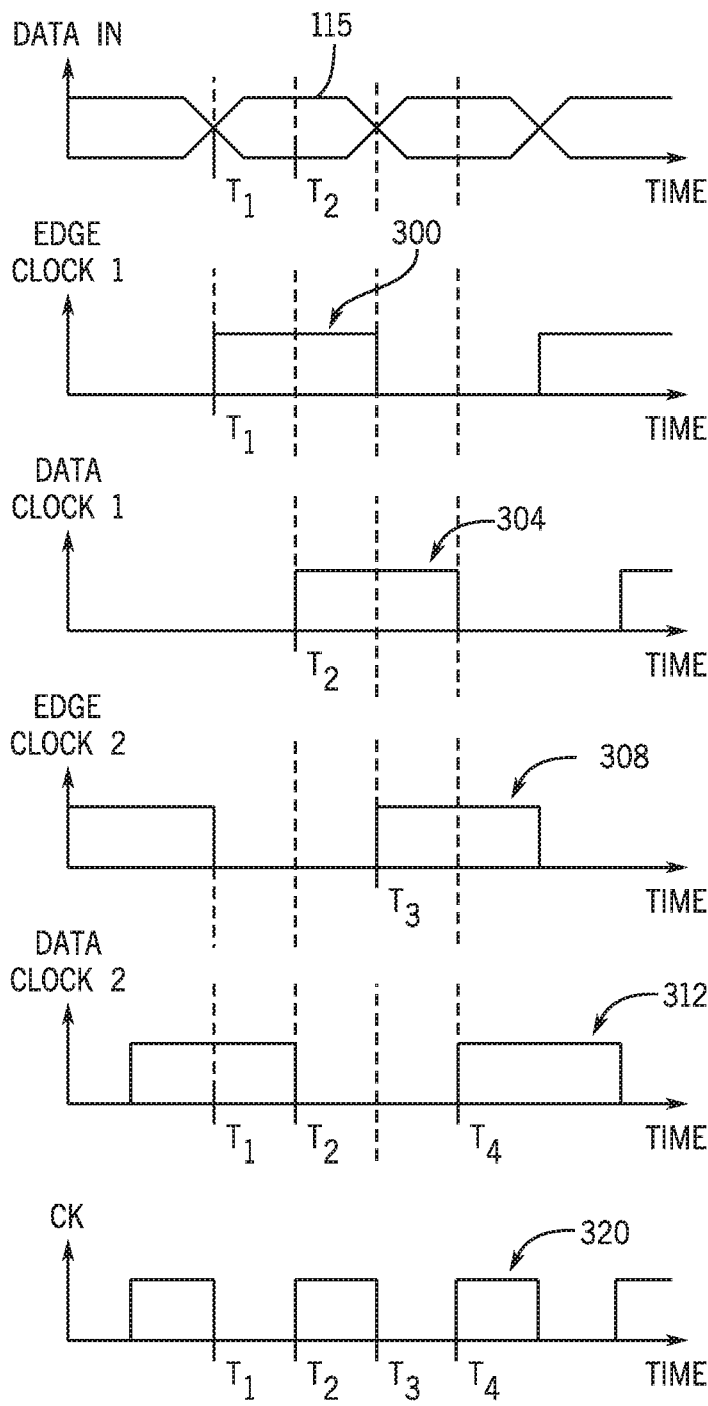

PHASE DELAY DIFFERENCE-BASED CHANNEL COMPENSATION

BACKGROUND

A high speed communication channel (a channel over which data is communicated at a frequency that exceeds one GigaHertz (GHz), for example) may be frequency band-limited, and as a result, the channel may introduce frequency-dependent channel losses. The losses, in turn, may result in signal distortion, such as inter symbol interference (ISI).

One way to compensate for frequency-dependent losses is to pre-distort the signal that is transmitted to the communication channel to take into account the response of the channel. Another way to compensate for frequency-dependent losses is to compensate the signal that is received from the channel.

BRIEF DESCRIPTION OF THE DRAWINGS

FIG. 2 is a waveform of a data signal received from a communication channel and having a phase aligned with the phase of a clock signal recovered from the data signal according to an example implementation.

FIGS. 3A and 3C are waveforms depicting edge clock signals used in clock and data recovery according to an example implementation.

FIGS. 3B and 3D are waveforms depicting data eye clock signals used in clock and data recovery according to an example implementation.

FIG. 3E is a waveform of an oversampling clock signal according to an example implementation.

DETAILED DESCRIPTION

Figure 1:
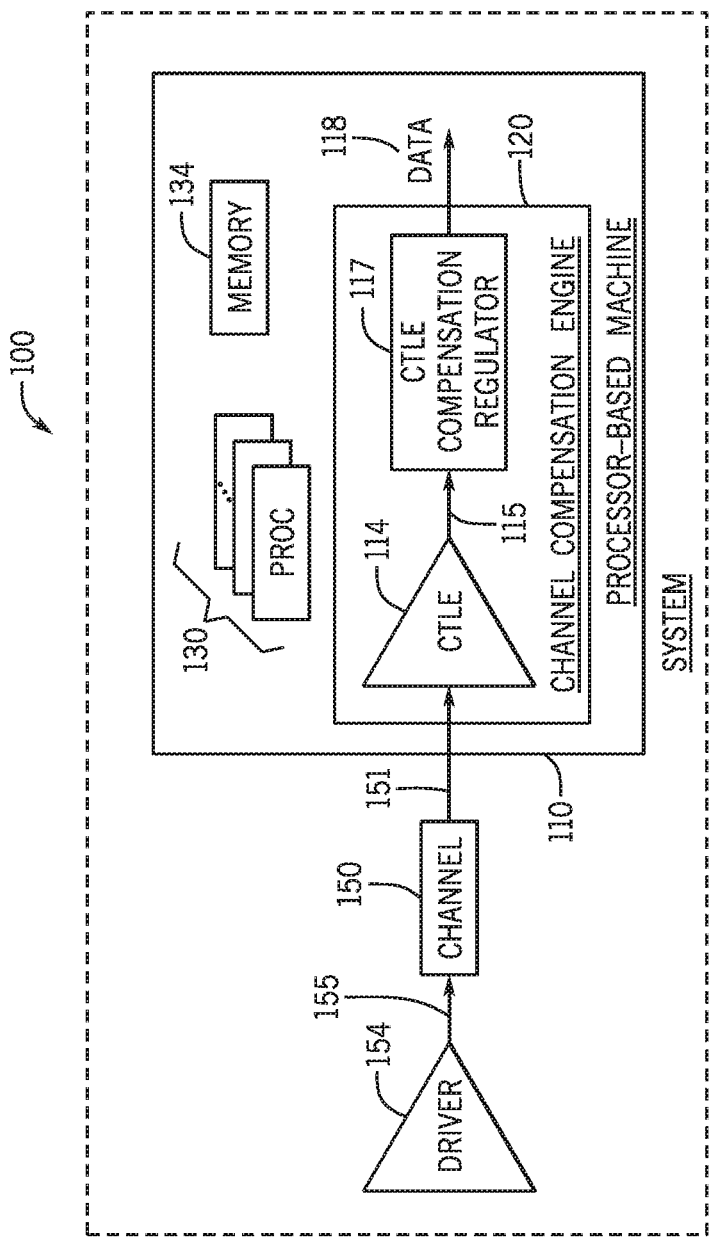
FIG. 1 is a schematic diagram of a system according to an example implementation.

One way to compensate for channel frequency-dependent communication channel losses is to compensate the signal that is received from the channel using an adaptive filter. One such filter is a continuous time linear equalizer (CTLE). In general, one or multiple filtering parameters (parameters to set a frequency pole, a zero and so forth) of the CTLE may be adjusted to adjust the CTLE's frequency transfer function for purposes of ideally applying a phase delay that has the opposite behavior of the phase delay that is imposed by the communication channel.

In accordance with example implementations, the signal that is communicated across the communication channel serially indicates or represents a time sequence of bits; and the communication channel, in general, may introduce a phase delay that depends on the frequency in which the bits transition between bit states.

In the following discussion, in a contiguous interval of time, an arbitrary number of bits, called a "bit pattern," may be communicated across the communication channel. One way to determine the appropriate filtering parameter(s) of the CTLE is to communicate a predetermined bit pattern through the communication channel, observe the output of the CTLE, and then adapt or adjust the compensation applied by the CLTE based on the observed phase delay of the signal provided at the CLTE's output.

In accordance with example systems and techniques that are disclosed herein, a channel filter, such as a CTLE, is adjusted to compensate for frequency dependent channel losses based on the difference of phase delays observed for relatively high and low frequency bit transition frequencies. In this context, during a given time segment, a given bit pattern is communicated across the communication channel. A "relatively low bit transition frequency" is associated with a time sequence, or pattern, of bits that are successively communicated over the communication channel and transition between bit states (i.e., between "0" and "1" bit values) at a relatively slower rate of time, as compared to a "relatively high bit transition frequency," which is associated with successively communicated bits that transition between bit states at a relatively faster rate of time. For example, the bit pattern "010101" has an associated relatively high bit transition frequency (i.e., a bit pattern in which the bit state changes every clock cycle), as compared to a bit pattern of "0000111100001111" (i.e., a bit pattern in which the bit state changes every fifth clock cycle), which has an associated relatively low bit transition frequency.

In general, the communication channel may impose a relatively longer phase delays to bit patterns associated with lower frequency bit transitions than to bit patterns associated with higher frequency bit transitions. In accordance with example implementations disclosed herein, a channel compensation engine observes an average phase delay for the signal provided by the CTLE for bit patterns having relatively low bit transition frequencies, observes an average phase delay for the signal for bit patterns having relatively high bit transition frequencies, and adjusts a compensation that is applied by a CTLE based on this difference. In accordance with some implementations, the channel compensation engine controls the compensation that is applied by the CTLE in a manner that minimizes, if not eliminates, the average phase delay difference, so that the signal provided by the CTLE, has the same or nearly the same phase delay for all bit patterns.

Due to the phase delay difference compensation that is disclosed herein, the bit patterns used to train the CTLE may be relatively arbitrary, in that the training is directed to observing bit patterns having different bit transition frequencies. A particular advantage of using arbitrary bit patterns is that the channel compensation may be applied for multiple communication standard protocols.

As a more specific example, FIG. 1 depicts a system 100 in accordance with some implementations. In general, the system 100 includes a processor-based machine 110, which is in communication with one or multiple high speed communication channels 150 (a channel having a clock frequency greater than 1 GigaHertz (GHz), for example). In general, the channel 150 may be a communication line of a backplane, a communication line of a cable, and so forth. For the example implementations discussed herein, a transmitter or driver 154, transmits a signal 155 to the communication channel 150. The signal propagates over the communication channel 150, which distorts the signal, to provide a signal 151 that is received from the channel 150. Depending on the particular implementation, the driver 154 and/or the communication channel 150 may be part of the processor-based machine 110 or may be part of another processor-based machine. Moreover, the communication channel 150 may communicate electrical or optical signals, depending on the particular implementation. For an optical communication channel 150, the system 100 may include interfaces to convert between optical and electrical signals.

For example implementations that are discussed herein, the signal that is communicated across the communication channel 150 represents a time sequence of serially transmitted bits (i.e., data), and this sequence of bits is associated with a clock signal (i.e., the bits are transmitted to the communication channel 150 in synchronization to a clock signal). Thus, the signal that is communicated across the communication channel indicates or represents data and an associated clock signal.

A channel compensation engine 120 of the processor-based machine 110 receives the signal 151 from the communication channel 150 and compensates the signal 151 for frequency-dependent losses that are introduced by the channel 150. For this purpose, the channel compensation engine 120 includes a channel filter, such as a CLTE 114, and a CTLE compensation regulator 117. More particularly, as described herein, the CTLE compensation regulator 117 observes a signal 115 (also called a "DATA IN signal" herein) that is provided at the output of the CLTE 114, adjusts the CLTEs compensation in response thereto, and recovers data 118 from the signal 115. In particular, the CTLE compensation regulator 117 observes the signal 115 for bit patterns that have different associated bit transition frequencies. The CTLE compensation regulator 117, in accordance with example implementations, adjusts the compensation applied by the CLTE 114 for purposes of reducing, if not eliminating, any phase delay variation for different bit transition frequencies.

Among its other components, in accordance with some implementations, the processor-based machine 110 may include one or multiple processing cores 130 (one or multiple central processing units (CPUs), graphic processing units (GPUs), and so forth). Moreover, the processor-based machine 110 may include one or more non-transitory storage memories 134. In this regard, a non-transitory memory 134 may include one or more non-transitory storage devices, such as semiconductor storage devices, memristors, phase change memories, magnetic storage devices, optical storage devices, and so forth, depending on the particular implementation. The memory 134 may store machine executable instructions, or "software," which may be executed by one or more of the processing cores 130 for purposes of forming one, multiple or all components of the channel compensation engine 120. Moreover, one, multiple or all components of the channel compensation engine 120 may be dedicated hardware components. Thus, the channel compensation engine 120 may be formed from hardware and/or software components, depending on the particular implementation.

In accordance with example implementations, the channel compensation engine 120 recovers a clock signal to which the data of the signal 115 is synchronized. Referring to FIGS. 2, 3A, 3B, 3C, 3D and 3E in conjunction with FIG. 1, as a more specific example, FIGS. 2, 3A, 3B, 3C, 3D and 3D depict a one half rate clock and data (CDR) technique that may be applied by the channel compensation engine 120, in accordance with example implementations. For this example, a DATA IN signal 115 (FIG. 2) is provided at the output of the CTLE 114 for an example case in which the phase of the signal 115 is aligned with a two time (2×) oversampling clock signal 320 (called "CK" and depicted in FIG. 3E), i.e., the clock signal that is recovered from the DATA IN signal 115.

For this example, sampling of the data bits of the DATA IN signal 115 (to recover the bits of data from the DATA IN signal) occurs at the rising, or positive going, edges of the CK clock signal 320. Thus, the bits of data from the DATA IN signal 115 are sampled at times $T_2$, $T_4$, and so forth. The falling, or negative going, edges of the CK clock signal 320 are aligned with the bit transition edges of the DATA IN signal 115, such as a times $T_1$, $T_3$, and so forth.

In accordance with example implementations, the channel compensation engine 120 represents the OK clock signal 320 using four, lower frequency clock signals. In this manner, in accordance with example implementations, each of these lower frequency clock signals has a frequency that is one half of the frequency of the CK clock signal 320 and include two edge clock signals 300 (FIG. 3A) and 308 (FIG. 3C); and two data eye clock signals 304 (FIG. 3B) and 312 (FIG. 3D).

The channel compensation engine 120, in accordance with example implementations, samples the data transition edge of the DATA IN signal 115 in synchronization with the positive going edges of the edge clock signals 300 and 308. As such, the edge clock signals 300 and 308 are used to sample alternate data edges of the DATA IN signal 115: the positive going edge of the edge clock signal 300 triggers sampling of the data transition edge of the DATA IN signal 115 at time $T_1$, the positive going edge of the edge clock signal 308 triggers sampling of the data transition edge of the DATA IN signal 115 at time $T_3$, and so forth.

Moreover, the channel compensation engine 120, in accordance with example implementations, samples the data eyes of the DATA IN signal 115 in synchronization with the positive going edges of the data eye clock signals 304 and 312. As such, the data eye clock signals 304 and 312 are used to sample alternate data eyes of the DATA IN signal 115: the positive going edge of the data eye clock signal 304 triggers sampling of the data eye of the DATA IN signal 115 at time $T_2$, the positive going edge of the data eye clock signal 312 triggers sampling of the data eye of the DATA IN signal 200 at time $T_4$, and so forth.

In accordance with example implementations, the channel compensation regulator 117 regulates the compensation that is applied by the CTLE 114 based on bit transition frequencies for purposes of maintaining the phases of the clock signals 300, 304, 308 and 312 in alignment with the phase of the DATA IN signal 115 (i.e., for purpose of maintaining the phase of the recovered CK clock signal 320 in alignment with the phase of the data, as shown in FIGS. 2 and 3A-3E). As an example of a phase misalignment, the recovered CK clock signal 320 may lag the DATA IN signal 115, and as such, the positive going edge of the edge clock signal 300 may not occur at time $T_1$, as shown in FIG. 3A, but instead may occur slightly before time $T_1$ (a quarter cycle of the signal 115 before time $T_1$, for example). As another example of a phase misalignment, the recovered CK clock signal 320 may lead the DATA IN signal 115, and as such, the positive going edge of the edge clock signal 300 may not occur at time $T_1$, as shown in FIG. 3A, but instead may occur slightly after time $T_1$ (a quarter cycle of the signal 115 after time $T_1$, for example).

Although example implementations are described herein in which the CTLE compensation regulator 117 uses a one half rate CDR technique, the channel compensation regulator 117 may apply other CDR techniques (a baud rate-based CDR, for example), in accordance with further example implementations.

Figure 4:
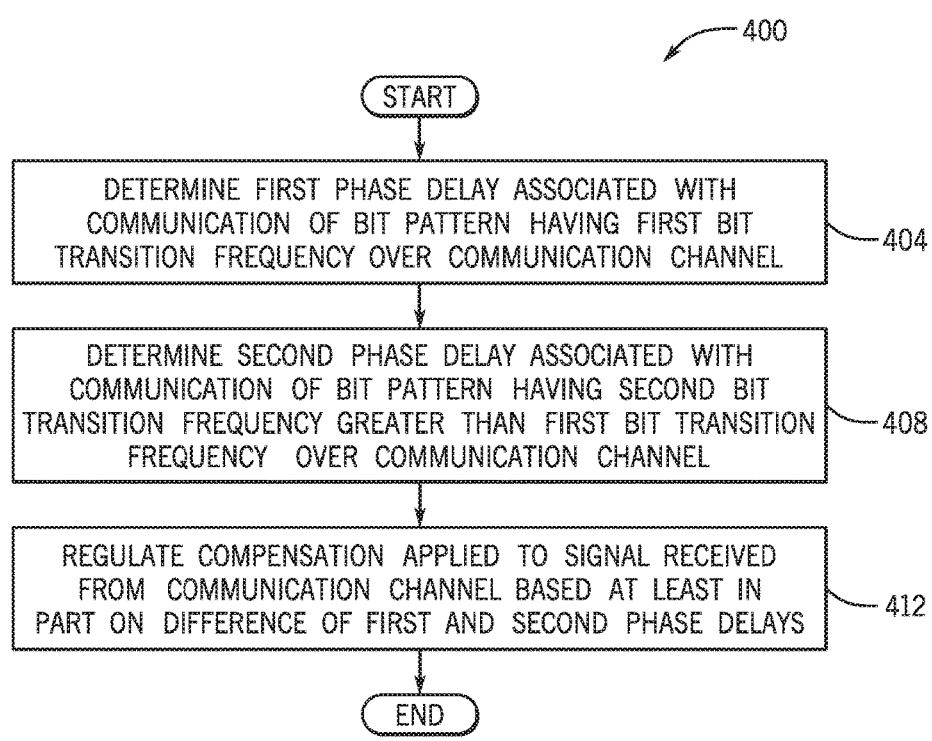
FIGS. 4 and 6 are flow diagrams depicting techniques to apply phase delay difference-based channel compensation according to example implementations.

Referring to FIG. 4 in conjunction with FIG. 1, thus, in accordance with example implementations, the channel compensation engine 120 applies a compensation technique 400. Pursuant to the technique 400, the channel compensation engine 120 determines (block 404) a first phase delay that is associated with the communication of a bit pattern that has a first bit transition frequency over a communication channel; and the channel compensation engine 120 determines (block 408) a second phase delay that is associated with communication of a bit pattern that has a second bit transition frequency that is greater than the first bit transition frequency over the communication channel. The channel compensation engine 120 regulates (block 412) a compensation that is applied to the signal received from the communication channel based at least in part on a difference of the first and second phase delays.

As described below, in accordance with example implementations, the determined first phase delay may be an observed average phase delay for bit patterns having relatively low bit transition frequencies (bit transition frequencies lower than a predetermined threshold, for example); and the determined second phase delay may be an observed average phase delay for bit patterns having relatively high bit transition frequencies (bit transition frequencies greater than the predetermined threshold used for the first phase delay or greater than another, higher predetermined threshold, depending on the particular implementation).

Figure 5:
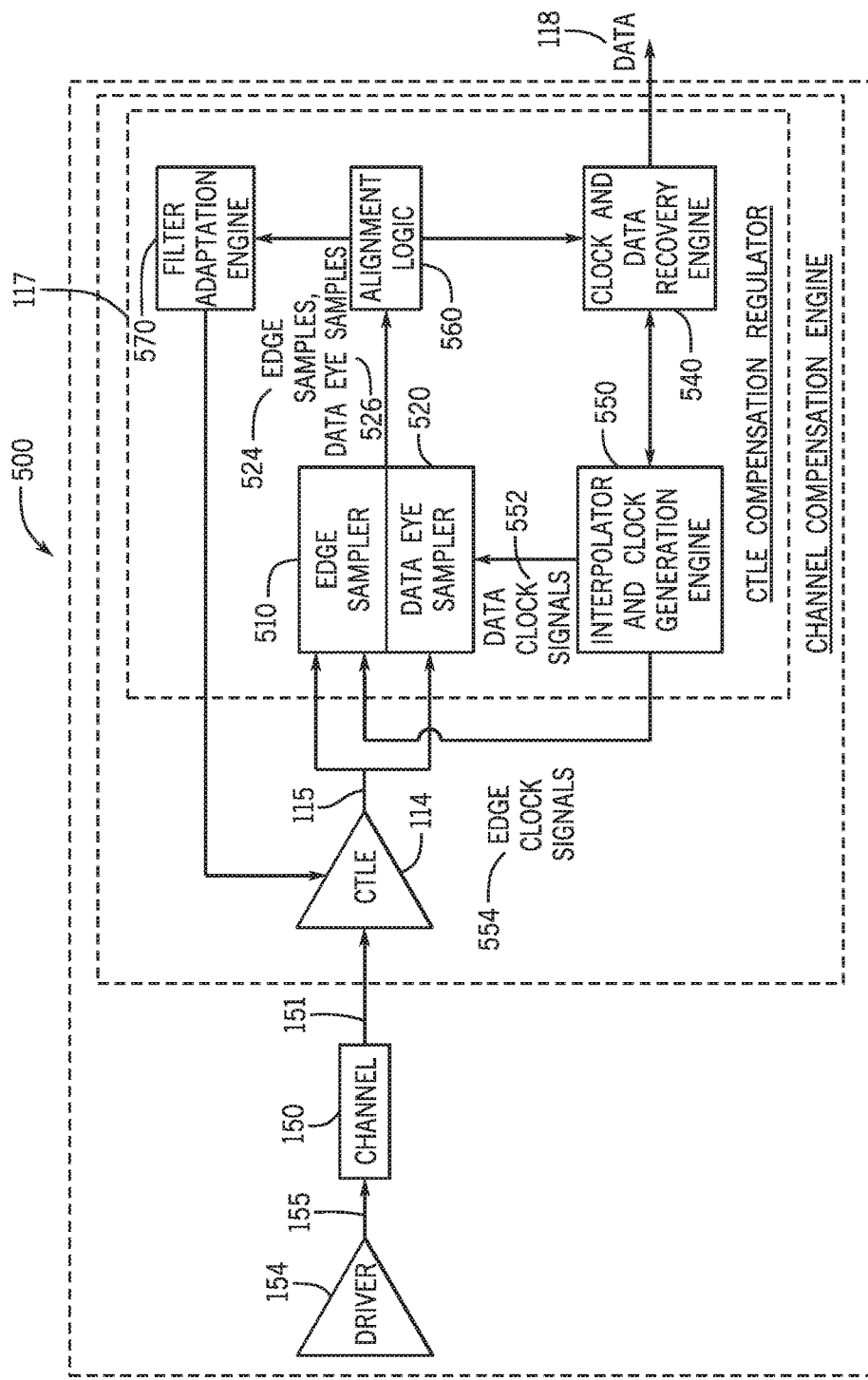
FIG. 5 is a schematic diagram of a channel compensation engine of the system of FIG. 1 according to an example implementation.

Referring to FIG. 5, in accordance with example implementations, the CTLE compensation regulator 117 of the channel compensation engine 120 may include a clock and data recovery engine 540 that recovers the data 118 from the signal 115 that is provided by the CLTE 114 and controls an interpolator and clock generation engine 550 (based on clock domain and phase alignment signals provided by the alignment logic 560, described below) to generate data clock signals 552 and edge clock signals 554. The CTLE compensation regulator 117 may also include an edge sampler 510, which, in accordance with example implementations, samples the signal 115 in synchronization with edges of the edge clock signals 554, as described above. In this manner, in accordance with example implementations, an interpolator and clock generation engine 550 of the CTLE compensation regulator 117 provides edge sampling times 554 to the edge sampler 510, i.e., times at which the edge sampler 510 is to sample the signal 115. In accordance with some implementations, the edge sampling times 554 may be indicated by one or multiple edge clock signals (such as the edge clock signals 300 and 308 that are depicted in FIGS. 3A and 3C, for example) that are provided by the engine 550; and in accordance with further example implementations, the edge sampling times 554 may be represented by digital values. The edge sampler 510 provides the edge samples 524 to alignment logic 560.

The CTLE compensation regulator 117 may also include a data eye sampler 520, which samples the signal 115 at data eye sampling times 552 that are indicated by the engine 550. In accordance with some implementations, the data eye sampling times 552 may be represented by corresponding edges of one or multiple data eye clock signals (such as the data eye clock signals 304 and 312 that are depicted in FIGS. 3B and 3D, for example) that are provided by the engine 550; and in accordance with further example implementations, the data eye sampling times 552 may be represented by digital data. The data eye samples 526 may also be provided to the alignment logic 560.

The edge samples 524 and data eye samples 526 are captured at different times. Therefore, in accordance with example implementations, the alignment logic 560 first aligns the edge and data eye clock signals so that these signals are in the same clock domain. Moreover, in accordance with example implementations, after this alignment, the alignment logic 560 generates "votes" representing whether the recovered clock signal is early or late with respect to the signal 115. In accordance with example implementations, the filter adaptation engine 570 receives a given vote from the alignment logic 560; filters a window (a sliding window, for example) of the recovered bit stream to classify the bit pattern within the window as being associated with either a relatively low frequency bit transition frequency or a relatively high frequency bit transition frequency; and updates the average phase delay for the determined transition frequency class based on the vote.

As a more specific example, the alignment logic 560 may perform the voting as follows. In the following notation, "$d_0$" represents the bit value sampled for the immediately previous data eye; "$d_1$" represents the bit value sampled for the current data eye; and "$e_0$" represents the sampled edge value for the bit transition edge that occurs between the times when the $d_0$ and $d_1$ values are sampled.

In accordance with example implementations, the alignment logic 560, in synchronization with the positive going edges of the data eye clock signals, provides an indicator (called "PHASE EARLY" herein), i.e., a vote, to indicated whether the phase of the recovered clock signal is early. In particular, in accordance with example implementations, in response to a data transition occurring (i.e., $d_0 \neq d_1$), the alignment logic 560 applies an Exclusive OR (XOR) function to the "$d_1$" and "$e_0$" bit values as follows:

$$\text{PHASE EARLY} = d_1 \text{ XOR } e_0. \qquad \text{Eq. 1}$$

In this manner, in accordance with example implementations, the filter adaptation engine 570 registers a vote of the phase being early in response to the PHASE EARLY representing a logic one.

In accordance with example implementations, the alignment logic in synchronization with the positive going edges of the data eye clock signals, provides an indicator (called "PHASE LATE" herein), i.e., a vote, of whether the phase of the recovered clock signal is early. In particular, in accordance with example implementations, in response to a data transition occurring (i.e., $d_0 \neq d_1$), the alignment logic 560 applies an XOR function to the "$d_0$" and "$e_0$" bit values as follows:

$$\text{PHASE LATE} = d_0 \text{ XOR } e_0. \qquad \text{Eq. 2}$$

In this manner, in accordance with example implementations, the filter adaptation engine 570 registers a vote of the phase being late in response to the PHASE LATE representing a logic one.

In accordance with example implementations, the filter adaptation engine 570 may maintain an average phase delay for the relatively high bit transition frequency bit patterns by adding and subtracting to/from a corresponding count value for this average, depending on whether PHASE LATE or PHASE early votes are observed for these high frequency patterns. Likewise, in accordance with example implementations, the filter adaptation engine 570 may maintain an average phase delay for the relatively low bit transition frequency bit patterns by adding and subtracting to/from a corresponding count value for this average, depending on whether PHASE LATE or PHASE early votes are observed for these lower frequency patterns. Based on the average phase delays, the filter adaptation engine 570 may then adjust one or multiple filtering parameters of the CTLE 114 until the average phase delay associated with the lower bit transition frequencies is close or equal to the average phase delay associated with the higher bit transition frequencies.

Figure 6:
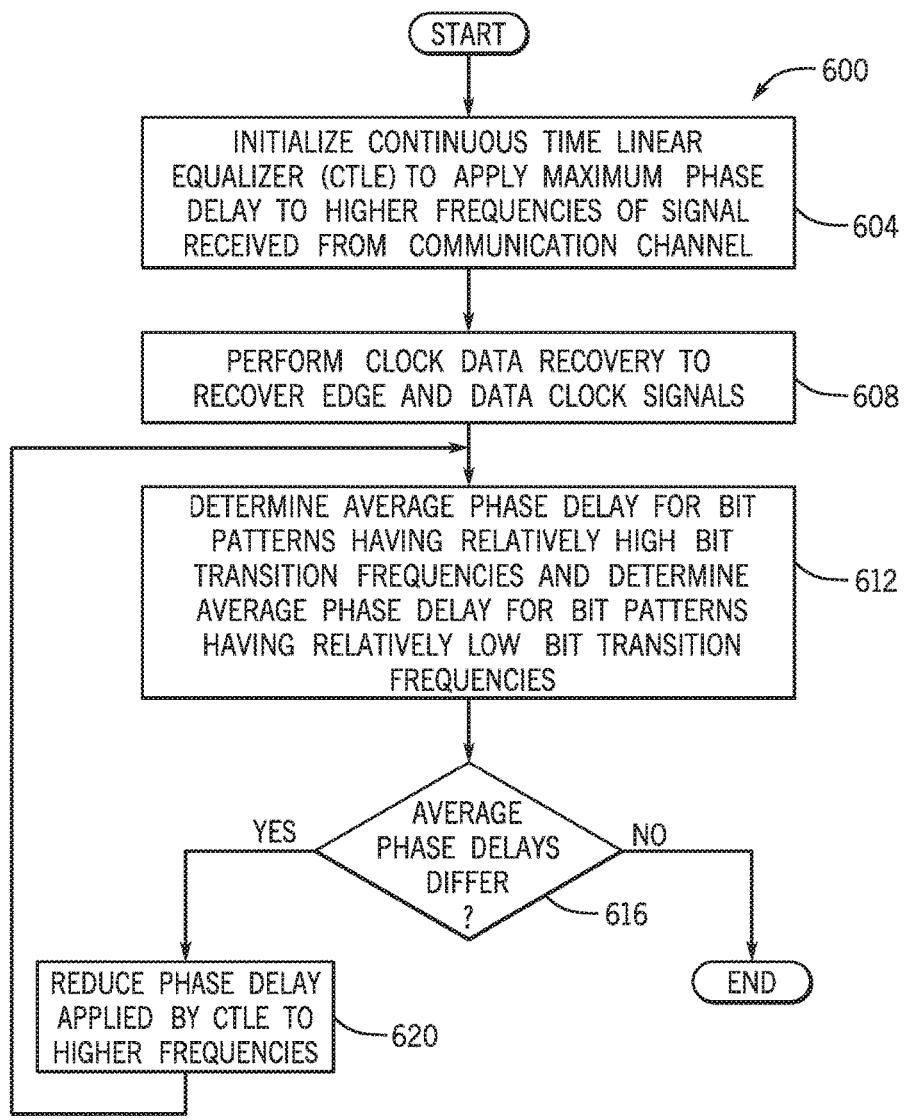

Referring to FIG. 6 in conjunction with FIG. 5, in accordance with some implementations, the CTLE compensation regulator 117 performs a technique 600. The technique 600 includes initializing the CTLE 114 to apply maximum compensation. In this manner, in accordance with example implementations, the filter adaptation engine 570 configures the CTLE 114 to provide its maximum phase delay to the higher frequencies of the signal received from the communication channel 150. The channel configuration engine 120 also performs (block 608) clock data recovery to place the edge sampling at the average data crossing, or transition, and correspondingly configures the data eye sampling.

Pursuant to block 612, the filter adaptation engine 570 determines the average phase delay for relatively high bit transition frequencies and the average phase delay for low relatively low bit transition frequencies. If the filter adaptation engine 570 determines (decision block 616) that the relatively high bit transition frequencies have, on average, a relatively longer phase delay than the average phase delay of the relatively low bit transition frequencies (i.e., the filter adaption engine 570 determines that the average phase delays differ), then the engine 570 adjusts the filtering parameter(s) of the CTLE 114 to reduce the phase delay that is being applied by the CTLE 114 (by one step, for example) to the higher frequencies, pursuant to block 620; and control returns to block 612. Otherwise, in accordance with example implementations, if in decision block 616, the filter adaptation engine 570 determines that the average phase delays are the same or within a predefined threshold difference, then no further adjustment of the CTLE's compensation is performed.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   determining a first phase delay associated with communication of a bit pattern having a first bit transition frequency over a communication channel;
   determining a second phase delay associated with communication of a bit pattern having a second bit transition frequency greater than the first bit transition frequency over the communication channel; and
   regulating a compensation applied to a signal received from the communication channel based at least in part on a difference of the first and second phase delays.

2. The method of claim 1, wherein:
   determining the first phase delay comprises determining an average phase delay for a first plurality of bit patterns communicated over the communication channel and having associated bit transition frequencies; and
   determining the second phase delay comprises determining an average phase delay for a second plurality of bit patterns communicated over the communication channel and having associated bit transition frequencies that are greater than the bit transition frequencies associated with the first plurality of bit patterns.

3. The method of claim 1, wherein regulating the compensation comprises selectively regulating a phase delay applied to bit patterns associated with the second bit transition frequency.

4. The method of claim 1, wherein regulating the compensation comprises regulating the compensation to reduce the difference of the first and second phase delays.

5. The method of claim 1, further comprising:
   recovering a clock signal associated with the signal received from the communication channel; and
   using a timing indicated by the clock signal to determine the first and second phase delays.

6. The method of claim 1, wherein determining the first and second phase delays comprises:
   sampling data eye values of the signal received from the communication channel in synchronization to edges of a first clock signal derived from the signal received from the communication channel;
   sampling edge values of the signal received from the communication channel in synchronization to edges of a second clock signal derived from the signal received from the communication channel; and
   determining the first and second phase delays based at least in part on the sampled data eye values and the sampled edge values.

7. An apparatus comprising:
   a clock data recovery engine to recover a clock signal from a signal provided by a channel filter;
   an edge sampler to sample edge values for the signal received from the channel filter at times corresponding to edges of the recovered clock signal;
   a data eye sampler to sample data eye values for the signal received from the channel filter at data eye times corresponding to edges of the recovered clock signal; and
   a filter adaptation engine to regulate the channel filter, the filter adaptation engine to:
      determine a first average phase delay for the signal provided by the channel filter for a first plurality of bit patterns having associated bit transition frequencies;
      determine a second average phase delay for the signal provided by the channel filter for a second plurality of bit patterns having associated bit transition frequencies greater than the bit transition frequencies associated with the first plurality of bit patterns; and
      control the channel filter based at least in part on the first and second average phase delays.

8. The apparatus of claim 7, wherein the channel filter comprises a continuous time linear equalizer.

9. The apparatus of claim 7, wherein the filter adaption engine:
   initializes the channel filter to apply a maximum phase delay to bit patterns of the second plurality of bit patterns; and
   selectively performs iterations, wherein in each interaction, the filter adaptation engine re-determines the first and second average phase delays, and selectively reduces a phase delay applied by the channel filter to bit patterns of the second plurality of bit patterns based at least in part on a difference of the re-determined first and second average phase delays.

10. The apparatus of claim 9, further comprising:
    edge alignment logic to determine whether the signal has a leading or lagging phase delay relative to the recovered clock signal.

11. A system comprising:
    a continuous time linear equalizer to receive a first signal from a communication channel and apply a compensation to the first signal to provide a second signal; and
    a channel compensation engine to:

determine a first phase delay for the second signal for a bit pattern having a first bit transition frequency;

determine a second phase delay for the second signal for a bit pattern having a second bit transition frequency greater than the first bit transition frequency; and control the continuous time linear equalizer based at least in part on a difference of the first and second phase delays.

12. The apparatus of claim 11, wherein:

the first phase delay comprises a first average phase delay associated with a first plurality of bit patterns having associated bit transition frequencies;

the second phase delay comprises a second average phase delay associated with a second plurality of bit patterns having associated bit transition frequencies greater than the bit transition frequencies associated with the first plurality of bit patterns; and the channel compensation engine controls the continuous time linear equalizer based at least in part on a difference of the first and second average phase delays.

13. The apparatus of claim 11, wherein the channel compensation engine controls the continuous time linear equalizer to selectively regulate a phase delay applied to bit patterns having associated bit transition frequencies greater than the bit transition frequencies associated with the first plurality of bit patterns.

14. The apparatus of claim 11, wherein the channel compensation engine controls the continuous time linear equalizer to reduce the difference of the first and second phase delays.

15. The apparatus of claim 11, wherein:

the channel compensation engine further comprises a clock and data recovery engine to recover a clock signal and data associated with the signal received from the communication channel; and the channel compensation engine determines the first and second phase delays based at least in part on a timing indicated by the clock signal.

* * * * *